Patented June 9, 1931

1,809,207

UNITED STATES PATENT OFFICE

FRITZ MAYER, OF FRANKFORT-ON-THE-MAIN, GERMANY, ASSIGNOR TO GENERAL ANILINE WORKS, INC., OF NEW YORK, N. Y., A CORPORATION OF DELAWARE

CONDENSATION PRODUCTS AND DYESTUFFS FROM THIONAPHTHENE-2.3-DICARBOXYLIC ACIDS AND PROCESS FOR PREPARING THE SAME

No Drawing. Application filed November 5, 1926, Serial No. 146,574, and in Germany November 10, 1925.

My present invention relates to the preparation of condensation products and dyestuffs from arylthiophene-2.3-dicarboxylic acids.

I have found that by treating thionaphthene-2.3-dicarboxylic acid of the following formula:

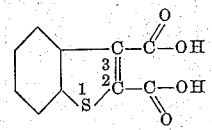

in the form of its anhydride with an aromatic hydrocarbon or a substitution-product or a homologue thereof in the presence of a condensing agent, for instance aluminium chloride, there are obtained aroyl-thionaphthenecarboxylic acids of the type formulæ:

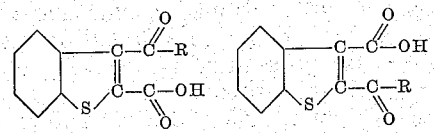

wherein R represents an aryl residue.

It could not be foreseen whether or not the presence of a heterocyclic nucleus would allow the above reaction to take place, because, for instance the condensation of the anhydride of quinoxaline dicarboxylic acid with an aromatic hydrocarbon cannot be accomplished.

I have also found that, if the compounds obtained in the above mentioned manner are converted into their chlorides and the latter are subjected to a further condensation, for instance in the presence of aluminium chloride, a closure of the ring takes place. The resulting benzo-naphthoquinone-thiofurones having most probably the type formula:

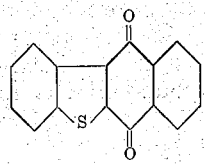

dye wool from the vat. If the closing of the ring is effected by means of sulfuric acid, sulfonation sometimes occurs simultaneously. The sulfonic acids of the benzo-naphthoquinone-thiofurones thus obtained have, as acid dyestuffs an affinity for the wool fibre.

I have found, moreover, benzo-naphthoquinone-thiofurones when acted upon with glycerine and sulfuric acid, are capable of being converted into derivatives of benzanthrone as, for example, into compounds having the type formula:

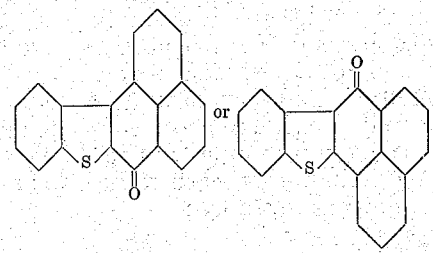

which, when melted with a condensing agent, for instance with an alkali, are transformed into the corresponding dibenzanthrone derivatives which dye cotton from the vat.

The following examples serve to illustrate my invention, but are not intended to limit it thereto:

1. 20,4 parts by weight of thionaphthene-2.3-dicarboxylic acid anhydride are stirred for 10 hours at room-temperature together with 40 parts by weight of aluminium chloride and 150 parts by volume of benzene and this mixture is then heated on the water bath for another hour. After the mixture has been decomposed by adding ice and hydrochloric acid, the excess of benzene is removed the residual mass is dissolved in sodium carbonate, the solution is filtered, and the reaction product is precipitated by means of hydrochloric acid. The benzoylthionaphthenecarboxylic acid so obtained melts at 216° C. (from benzene) and has one of the following formulas:

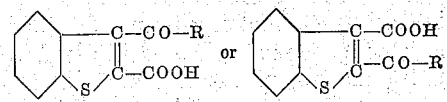

wherein R represents an aryl residue. 20,8 parts by weight of this acid are covered with thionyl chloride and allowed to stand overnight. The excess thionyl chloride is then distilled off in a vacuum and the resulting chloride is dissolved in carbon disulfide, whereupon 50 parts of aluminium chloride are added and the whole allowed to stand for 6 hours. Finally the mass is decomposed by adding ice and hydrochloric acid and worked up in the usual manner. The thus obtained benzo-naphthoquinone-thiofurone melts at 212°/213° C. (forming needles when crystallized from glacial acetic acid) and yields, on addition of hydrosulfite and caustic soda solution, a yellowish-brown vat which dyes wool yellow tints. The dyestuff has the following formula:

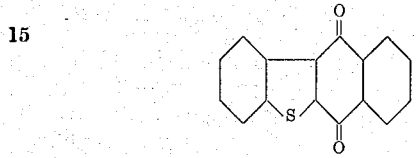

2. 5,5 parts by weight of 6-chloro-4-methylthionaphthene-2.3-dicarboxylic acid of the melting point 259/260° C. (produced from 6-chloro - 4 - methyl - 3 - hydroxythionaphthene like the thionaphthenedicarboxylic acid) are converted by boiling with acetic anhydride into the anhydride, which has a melting point of 188/189° C., and then further treated with benzene and aluminium chloride in the manner described in Example 1. The chlormethylbenzoylthionaphthenecarboxylic acid of one of the following formulas:

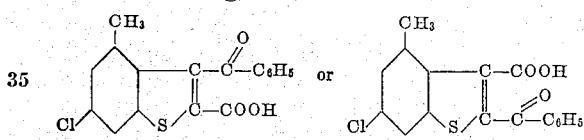

melts at 256–257° C. 5 parts by weight of this acid are heated together with 20 parts by weight of concentrated sulfuric acid for about one hour to 100° C. The mass is then poured into water and the reaction product is extracted with dilute ammonia. The remaining 8-methyl-6-chloro-benzonaphthoquinone-thiofurone melts when crystallized from glacial acetic acid at 278° C. and has the following constitution:

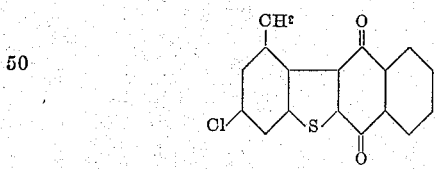

If instead of the benzene as used in Example 1 chlorobenzene is used, there is obtained a chlorobenzoylthionaphthenecarboxlyic acid of the melting point 198/199° C. and a chloro-benzonaphthoquinone-thiofurone of the melting point 215/220° C.

3. One part by weight of benzoylthionaphthenecarboxylic acid is treated for 1½ hours at room temperature with 8 parts of fuming sulfuric acid of 20% strength and the mixture, after cooling, is poured into a saturated solution of common salt. Thus, the sodium salt of a benzonaphthoquinone-thiofurone sulfonic acid

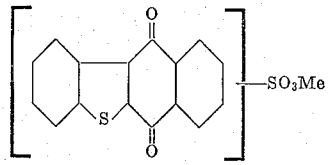

is obtained which dyes wool in an acid bath a yellow tint.

4. 2,4 parts by weight of benzonaphthoquinonethiofurone are heated to 130–140° C. together with 100 parts by weight of sulfuric acid of 62° Bé., 5 parts by weight of aniline sulfate and 5 parts of glycerine. After the mixture is heated for several hours it is poured in water, and the precipitated benzanthrone derivative of the following formulas:

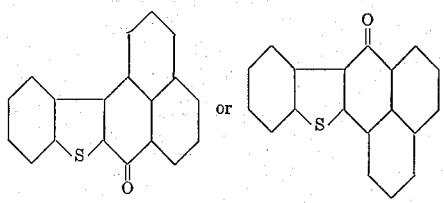

is dissolved by means of acetone. The remainder of the acetone extract is freed from any parent material by treatment with hydrosulfite and caustic soda solution and on recrystallization from benzene it is obtained in the form of crystals which melt at 182° C.

When the last mentioned benzanthrone derivative is melted in corresponding usual manner with potassium hydroxide, corresponding dibenzanthrone dyestuff is produced which, on addition of hydrosulfite and a solution of sodium hydroxide, yields a claret-red vat from which cotton is dyed a blue tint.

I claim:

1. The process for preparing condensation products which comprises treating the anhydride of a compound of the following formula:

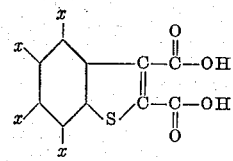

wherein $x$ stands for a substituent of the group consisting of hydrogen, halogen, alkyl, and alkoxy, with an aromatic hydrocarbon in the presence of aluminum chloride.

2. The process for preparing condensation products which comprises treating the anhydride of a compound of the following formula:

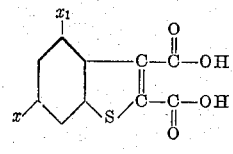

wherein $x$ stands for hydrogen or chlorine, $x_1$ stands for hydrogen or a methyl-group, with an aromatic hydrocarbon in the presence of aluminum chloride.

3. The process for preparing condensation products which comprises treating the anhydride of a compound of the following formula:

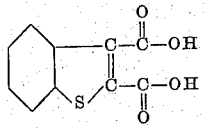

with an aromatic hydrocarbon in the presence of aluminum chloride.

4. The process for preparing condensation products which comprises treating the anhydride of a compound of the following formula:

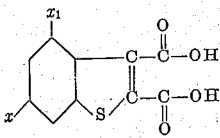

wherein $x$ stands for hydrogen or chlorine, $x_1$ stands for hydrogen or a methyl-group, with benzene in the presence of aluminum chloride.

5. The process for preparing condensation products which comprises treating the anhydride of a compound of the following formula:

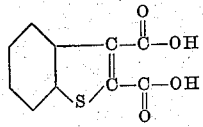

with benzene in the presence of aluminum chloride.

6. As new products, the condensation products of the following formula:

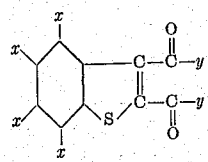

wherein $x$ stands for a substituent of the group consisting of hydrogen, halogen, alkyl and alkoxy, one $y$ stands for a hydroxy group, and the other $y$ stands for an aryl group, being colorless compounds, soluble in alkaline solvents and, in the form of their chlorides, capable of effecting the closure of the ring with aluminum chloride.

7. As new products, the condensation products of the following formula:

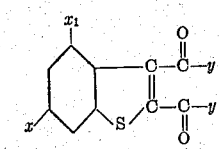

wherein $x$ stands for hydrogen or chlorine, $x_1$ stands for hydrogen or a $CH_3$ group, one $y$ stands for a hydroxy group, and the other $y$ stands for an aryl group, being colorless compounds, soluble in alkaline solvents and, in the form of their chlorides, capable of effecting the closure of the ring with aluminum chloride.

8. As new products, the condensation products of the following formula:

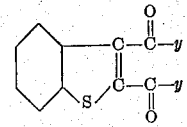

wherein one $y$ stands for a hydroxy group and the other $y$ stands for an aryl group, being colorless compounds, soluble in alkaline solvents and, in the form of their chlorides, capable of effecting the closure of the ring with aluminum chloride.

9. As a new product, the condensation product of the following formula:

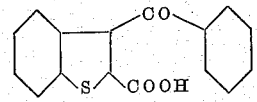

melting at 216° C. when crystallized from benzene.

In testimony whereof, I affix my signature.

FRITZ MAYER.